H. L. CHRISTIE.
CONSTRUCTION OF EXTENSIBLE TOWERS.
APPLICATION FILED JUNE 9, 1919.

1,426,276.

Patented Aug. 15, 1922.
2 SHEETS—SHEET 1.

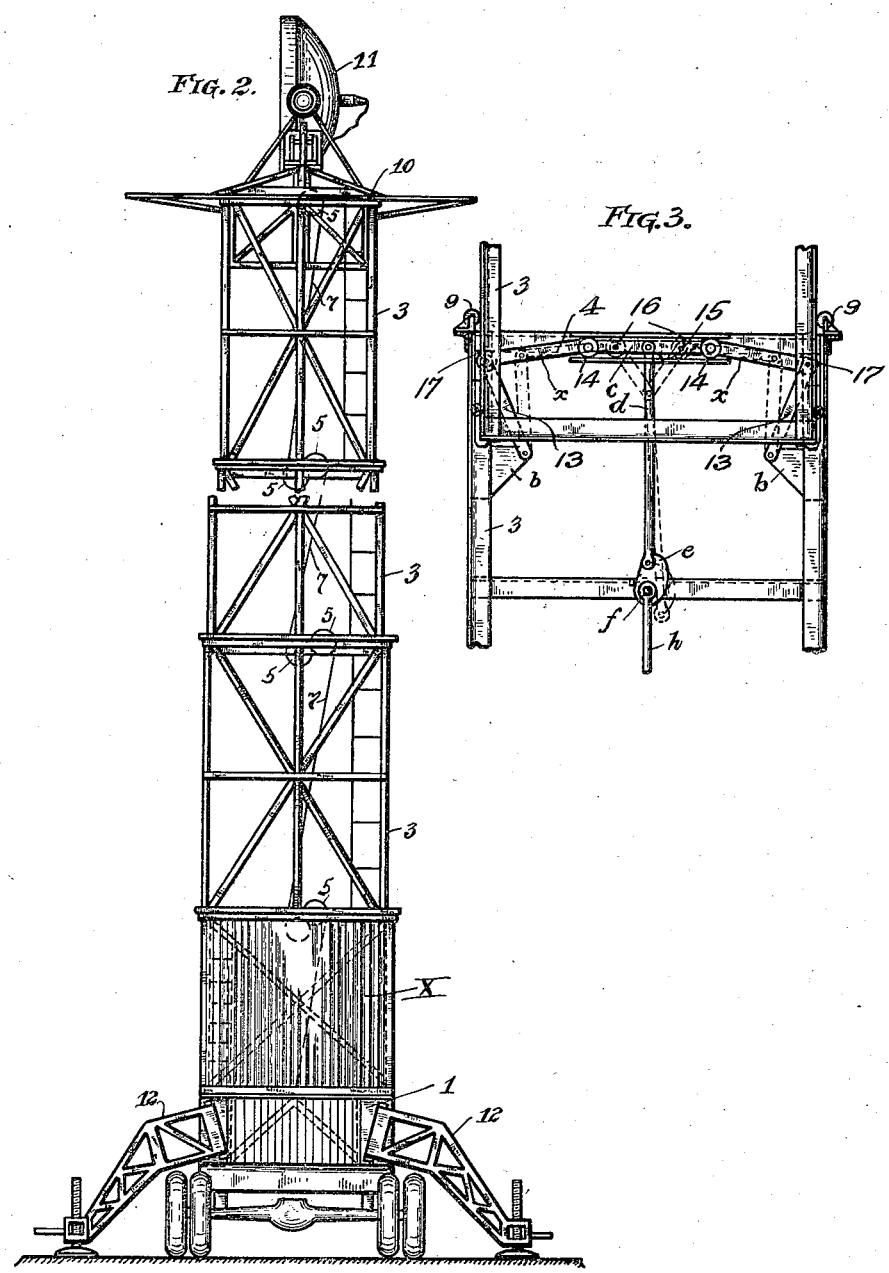

UNITED STATES PATENT OFFICE.

HANS L. CHRISTIE, OF PITTSBURGH, PENNSYLVANIA, ASSIGNOR OF ONE-FOURTH TO CHARLES H. CLARK, ONE-FOURTH TO HOWARD BEACH, AND ONE-FOURTH TO FREDERICK SHAEFER, ALL OF PITTSBURGH, PENNSYLVANIA.

CONSTRUCTION OF EXTENSIBLE TOWERS.

1,426,276.      Specification of Letters Patent.    Patented Aug. 15, 1922.

Application filed June 9, 1919. Serial No. 302,894.

*To all whom it may concern:*

Be it known that I, HANS L. CHRISTIE, a subject of the King of Norway, residing at Pittsburgh, in the county of Allegheny and State of Pennsylvania, have invented a new and useful Improvement in the Construction of Extensible Towers, of which improvement the following is a specification.

My invention relates to the construction of a tower on which is mounted a searchlight, the height of which over the ground is to be variable.

The object of the invention is to produce a device of this character which is either stationary or mounted upon an auto truck or other suitable motor vehicle and in which the search-light is entirely enclosed when in transit, but which is readily accessible for examination or any other purpose. The tower is constructed of sections connected in such a way that they may be successively elevated and locked in position so that the search-light can be elevated to and securely supported at its maximum height or any intermediate height between such maximum height and its lowest position. I accomplish this by means of the device hereinafter more specifically described, references being had to the accompanying drawings forming a part hereof, in which:

Figure 2 is an end view of the structure, the tower in elevated position upon its truck and outrigging foundations.

Figure 3 is an enlarged detail of portions of two sections showing the locking mechanism.

Figure 1:
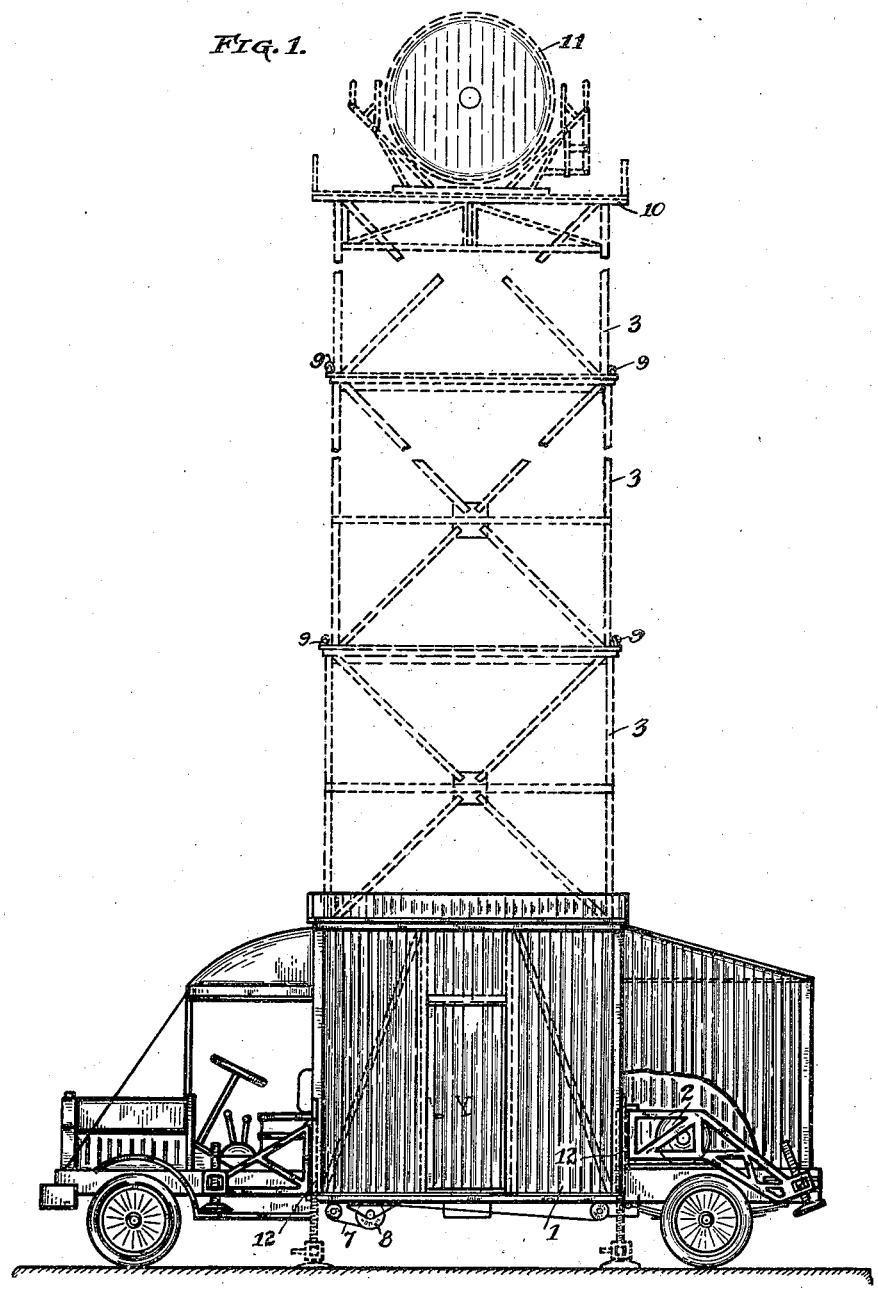
Figure 1 is a side elevation of the device, the solid lines showing the structure encased, and the dotted lines showing the tower elevated.

Referring to said drawings, 1 is a truck or vehicle of any suitable construction having mounted thereon a generator 2 which is preferably operated from the auto engine when an auto truck is used. A tower formed of series of sections 3 which are capable of being telescoped one within the other, and are capable of being elevated successively, and when in this elevated position, locked by the mechanism 4, shown in Fig. 3. The said truck includes or is provided with a casing or body portion X, the middle section of which constitutes an enclosure or receptacle for the several sections of the tower when collapsed, the rear section enclosing the generator as shown in Fig. 1. The said casing is also provided with a top or platform 10, on which the search light 11 is mounted, the said top serving as a roof or covering for the structure when the several sections are collapsed, a door Y is provided in the side of the casing to give access to the interior thereof. The said locking mechanism comprises the levers 13, the lower ends of which are pivotally secured to respectively the brackets or lubs $b$, $b$, secured to the side pieces of the outer sections respectively thereof. The upper ends of said levers are pivotally connected to the arms $x$, $x$, the inner ends of which respectively are provided with rollers 14 adapted to travel on the guide 15, and are connected to the toggle members $c$ which are provided also with rollers 16. The lower end of said toggle members is pivotally connected to the operating rod $d$ the lower end of which is connected to the cam plate $e$ mounted on the stud $f$, the said cam having a square headed boss mounted on said stud adapted to receive the lever or handle $h$, which is adapted to operate the toggle members for the purpose of locking and unlocking the sections. This operation is accomplished by throwing the lever or handle $h$ so as to bring the cam $e$ and rod $d$ into the position shown in dotted lines Fig. 3, which position shows the levers 13 withdrawn from beneath the lugs 17 on the ends of the side pieces of the inner sections permitting the said inner sections successively to descend when the several sections are successively operated by the flexible cable 7 operating over the drum 8 which is driven from the engine, each of the several sections being provided with sheaves 5 over which the hoisting cable operates and with guide rollers 9 to enable the same to be readily hoisted. 12—12 are outrigging supports which when the device is in transit are securely attached to the sides of the machine as shown in Fig. 1, the rear supports being disposed within recesses in the rear portions of the casing $x$ at each side thereof. When the tower is elevated these supports are arranged at right angles to the device and are anchored to the ground as shown in Fig. 2 to give stability to the tower when elevated. In operating the tower the first section is raised by operating the hoisting drum and when the bottom of said section is in horizontal alignment with the top of the next succeeding section the said sections are locked together by the locking mechanism heretofore described, that is, by operating the handle $h$ and throwing the levers 13 under the lugs 17, the second section is then raised and locked in a similar manner, and so on until the ultimate height of the tower is reached. In lowering the several sections the bottom section telescopes first and each succeeding section thereafter until finally the search light is lowered into the car and the roof or top is closed.

Having described my invention, what I claim and desire to secure by Letters Patent, is:

1. A portable extensible tower comprising a truck, mounted on wheels having a casing or body portion, a series of extensible sections supported on said truck, the casing constituting a receptacle for the said sections when collapsed, the upper section having a platform, a search light mounted on said platform, the said platform forming the roof or cover of the structure when the said sections are collapsed.

2. A portable extensible tower comprising a truck mounted on wheels having a casing, a series of extensible sections supported on said truck, the said casing constituting a receptacle for said sections when collapsed, the upper section carrying a platform on which a search light is mounted, the said platform forming the roof or cover of the structure when the said sections are collapsed, a continuous flexible means for hoisting the several sections successively and means to lock each section to the other successively, including toggle members, levers connected therewith adapted to engage under the upper section when said section is in raised position.

In testimony whereof, I have hereunto signed my name in the presence of two subscribing witnesses.

HANS L. CHRISTIE.

In the presence of—
ALEX. S. MABON,
JOHN H. KONEY.